(12) United States Patent
Hong et al.

(10) Patent No.: US 12,531,427 B2
(45) Date of Patent: Jan. 20, 2026

(54) DEVICE FOR CHARGING AND DISCHARGING BATTERY CELL AND METHOD OF CHARGING AND DISCHARGING BATTERY CELL USING THE SAME

(71) Applicant: LG ENERGY SOLUTION, LTD., Seoul (KR)

(72) Inventors: Suk Hyun Hong, Daejeon (KR); Joon Sung Bae, Daejeon (KR); Eui Kyung Lee, Daejeon (KR); Sang Jih Kim, Daejeon (KR); Beom Koon Lee, Daejeon (KR); Dong Hun Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 662 days.

(21) Appl. No.: 17/917,788

(22) PCT Filed: Nov. 22, 2021

(86) PCT No.: PCT/KR2021/017128
§ 371 (c)(1),
(2) Date: Oct. 7, 2022

(87) PCT Pub. No.: WO2022/124629
PCT Pub. Date: Jun. 16, 2022

(65) Prior Publication Data
US 2023/0135483 A1    May 4, 2023

(30) Foreign Application Priority Data

Dec. 11, 2020    (KR) .................. 10-2020-0172837

(51) Int. Cl.
*H02J 7/00*    (2006.01)

(52) U.S. Cl.
CPC .................. *H02J 7/0042* (2013.01)

(58) Field of Classification Search
CPC ..................................... H02J 7/0042
See application file for complete search history.

(56) References Cited

U.S. PATENT DOCUMENTS

2017/0133705 A1    5/2017    Niwa et al.
2020/0280090 A1    9/2020    Son et al.
(Continued)

FOREIGN PATENT DOCUMENTS

CN    101617419 A    12/2009
CN    111886750 A    11/2020
(Continued)

OTHER PUBLICATIONS

International Search Report for PCT/KR2021/017128 (PCT/ISA/210) mailed on Mar. 4, 2022.
(Continued)

*Primary Examiner* — Robert Grant
(74) *Attorney, Agent, or Firm* — Birch, Stewart, Kolasch & Birch, LLP

(57) ABSTRACT

A device for charging and discharging a battery cell includes first and second plates spaced from each other, the first and second plates being configured to press respective first and second surfaces of a battery cell locatable therebetween, and first and second pressing blocks located on the first and second plates, respectively, the first and second pressing blocks protruding from the first and second plates to face each other. The first and second pressing blocks are locatable in a space between a body and a gas pocket of the battery cell. A method using the device is also provided.

9 Claims, 5 Drawing Sheets

(56) References Cited

U.S. PATENT DOCUMENTS

2020/0365868 A1    11/2020  Son et al.
2022/0069277 A1*   3/2022  Lee .................... H01M 10/446

FOREIGN PATENT DOCUMENTS

| CN | 112005461 A | 11/2020 |
|---|---|---|
| EP | 3 709 431 A1 | 9/2020 |
| JP | 2012-3950 A | 1/2012 |
| KR | 10-2014-0032623 A | 3/2014 |
| KR | 10-2016-0129031 A | 11/2016 |
| KR | 10-2018-0007854 A | 1/2018 |
| KR | 10-2018-0025805 A | 3/2018 |
| KR | 10-2018-0106552 A | 10/2018 |
| KR | 10-2019-0072289 A | 6/2019 |
| KR | 10-2020-0017825 A | 2/2020 |
| KR | 10-2020-0017826 A | 2/2020 |
| KR | 10-2020-0050733 A | 5/2020 |
| KR | 10-2020-0106380 A | 9/2020 |
| WO | WO 2020/226299 A1 | 11/2020 |

OTHER PUBLICATIONS

Extended European Search Report for European Application No. 21903675.3, dated Jul. 9, 2024.

\* cited by examiner

[FIG. 1]
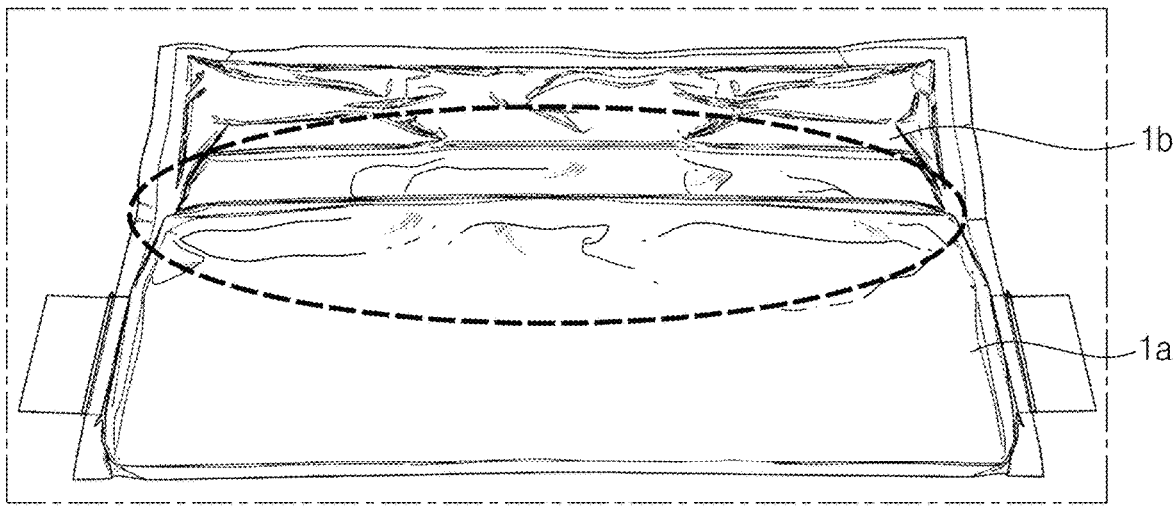

[FIG. 2] CONVENTIONAL ART
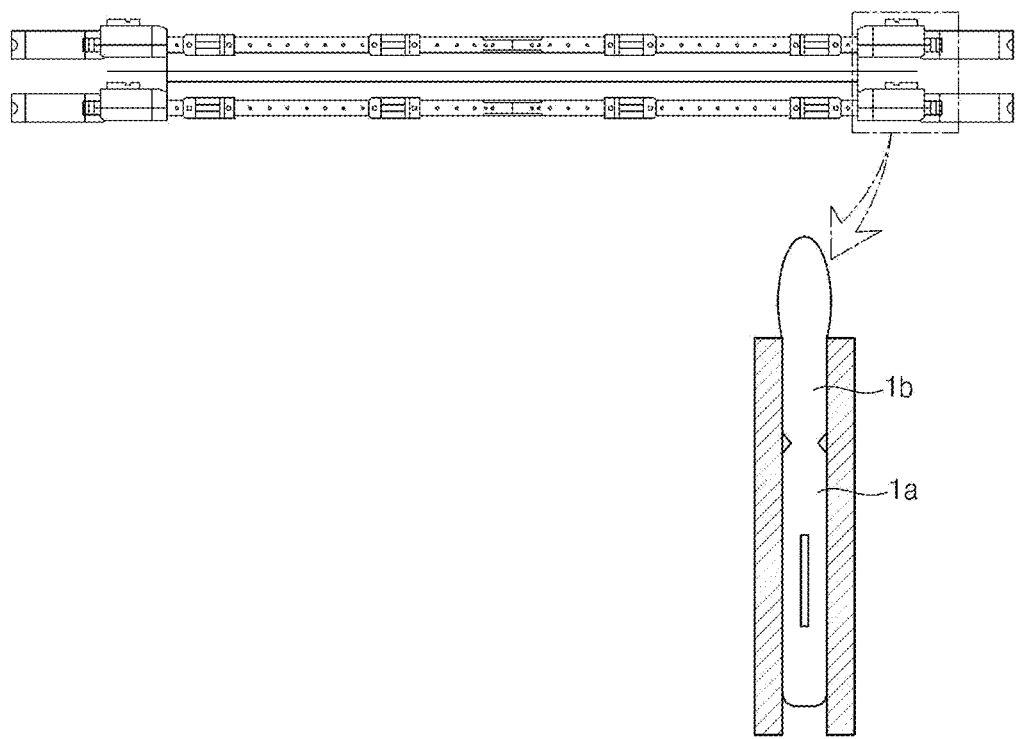

[FIG. 3]
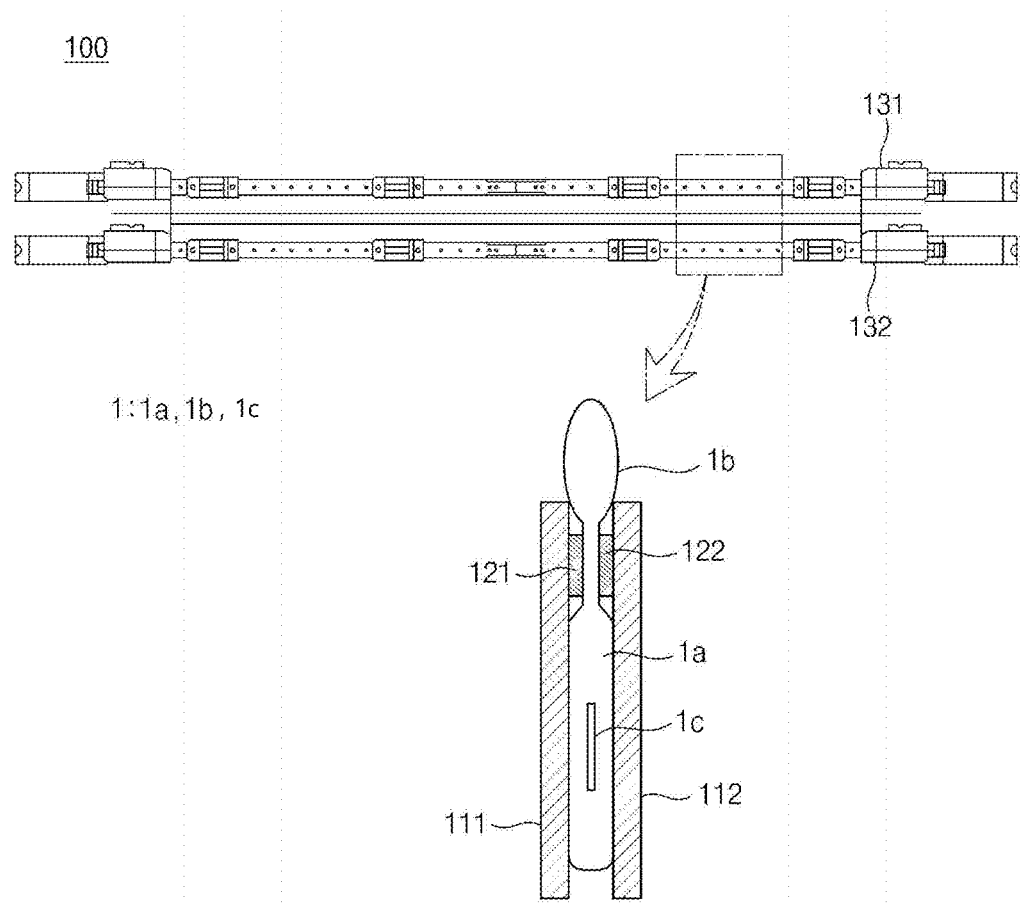

[FIG. 4]
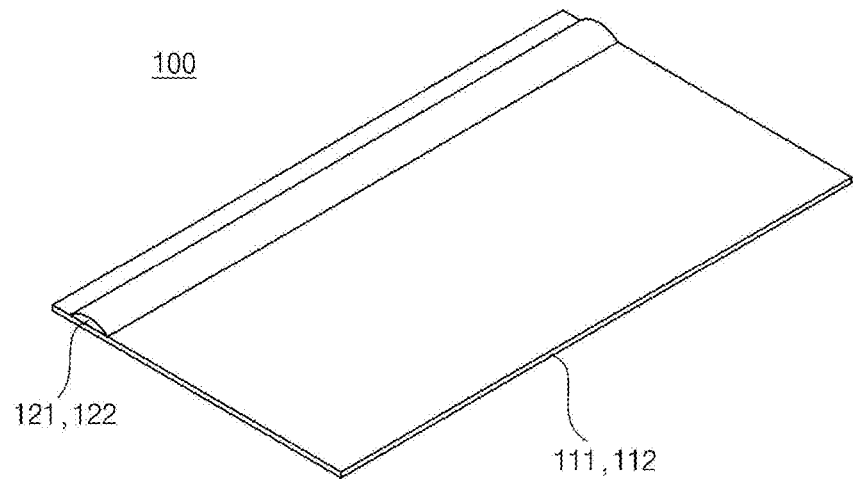

[FIG. 5]
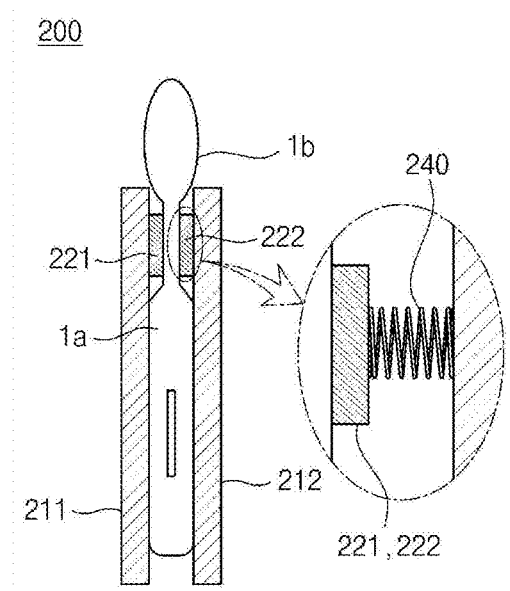

DEVICE FOR CHARGING AND DISCHARGING BATTERY CELL AND METHOD OF CHARGING AND DISCHARGING BATTERY CELL USING THE SAME

TECHNICAL FIELD

This application claims the benefit of priority based on Korean Patent Application No. 10-2020-0172837, filed on Dec. 11, 2020, and the entire contents of the Korean patent application are incorporated herein by reference.

The present invention relates to a device for charging and discharging a battery cell, and a method of charging and discharging a battery cell using the same.

BACKGROUND ART

Generally, the secondary battery may be divided into a cylindrical type, a prismatic type, a pouch type, etc., according to its shape. Herein, since the pouch type secondary battery is formed by using a pouch exterior material composed of a multilayer film including a metal layer (foil) and a synthetic resin layer coated on the upper and lower surfaces of the metal layer, the weight of the battery can be remarkably reduced compared to the cylindrical or square shape using metal cans, which makes it possible for the battery to be lightened and changed into various forms.

In such a pouch-type secondary battery, an electrode assembly is placed in a laminated form. An electrode tab and an electrode lead are connected to the electrode assembly, and the electrode lead protrudes from an exterior material of the pouch. Such an electrode lead is electrically connected to an external device through a contact and is supplied with power from the external device.

The pouch-type secondary battery (hereinafter, referred to as "battery cell") is manufactured through the process of assembling a cell and the process of activating the battery, and in the battery activation step, a battery cell is mounted on the charge and discharge device, and charge and discharge are performed as a condition which is necessary for activation. As described above, the process of performing a predetermined charge/discharge using a charging and discharge device for activation of the battery cell is referred to as a formation process.

In order to perform the formation process of such a battery cell, the battery cell should be properly mounted on the charging and discharging device. That is, the electrode lead of the battery cell needs to be disposed to contact the conductive portion of the charging and discharging device so that both are electrically connected, and the electrical connection state should be maintained while charging and discharging is in progress.

To this end, the charging and discharging device of the secondary battery generally includes a plurality of pressing plates for fixing a battery cell. Charging is performed by applying an electric current through the lead of the battery cell while applying pressure from two sides in a state that each battery cell is inserted between two pressing plates.

Likewise, it is possible to suppress the increase in the thickness of the battery cell according to gas generation during the charge and discharge process by pushing the battery cell using the pressing plate. At this time, the generated gas is collected in a gas pocket and is then removed after the formation process. Herein, the gas pocket is a portion extended in a direction perpendicular to the electrode lead in the cell body portion pressed during the formation process as a part of the pouch exterior material and may be cut in the pouch exterior material later.

On the other hand, when the gas pocket is sufficiently expanded by the formation process, the additionally generated gas in the battery cell expands the region between the body and the gas pocket of the battery cell. As such, the internal pressure of the pouch case increases due to gases generated during the charge and discharge process, and the adhesive layer of a region between the body and the gas pocket of the battery cell is broken.

FIG. 1 is a photograph showing a pouch-type battery cell having gone through a formation process according to a conventional art, and FIG. 2 is a schematic diagram showing a region between the body of the gas pocket of the battery cell having gone through a formation process according to a conventional art.

Referring to FIGS. 1 to 2, a swelling phenomenon may occur in the pouch-type battery cell 1, which has gone through the formation process according to a conventional art, as the inner adhesive layer of a region between the body 1a and the gas pocket 1b of the battery cell 1 is broken. Further, the pouch case may be composed of an outer insulating layer and an inner adhesive layer made of a polymer material, and a metal layer interposed between the outer insulating layer and the inner adhesive layer. Herein, an insulation voltage defect is caused as a metal layer of the region between the body 1a and the gas pocket 1b of the battery cell is exposed by the above-described phenomenon.

Hence, since serious problems may be caused in the operation of such a battery cell, there is a need for a charging and discharging device and method capable of suppressing a swelling phenomenon of a region between the body and the gas pocket of the battery cell.

DISCLOSURE

Technical Problem

The present invention is believed to solve at least some of the above problems. For example, an aspect of the present invention provides a device for charging and discharging a battery cell capable of suppressing a swelling phenomenon of a region between the body and the gas pocket of a battery cell during a formation process of the battery cell, and a method of charging and discharging a battery cell using the same.

Technical Solution

The present invention provides a device for charging and discharging a battery cell. In one example, a device for charging and discharging a battery cell according to the present invention includes: first and second plates spaced from each other, the first and second plates being configured to press respective first and second surfaces of a battery cell locatable therebetween; and first and second pressing blocks located on the first and second plates, respectively, the first and second pressing blocks protruding from the first and second plates to face each other. At this time, the first and second pressing blocks are locatable in a space between a body and a gas pocket of the battery cell.

In another example, in the device for charging and discharging a battery cell according to the present invention, first and second elastic pressing members are interposed between the first plate and the first pressing block and between the second plate and the second pressing block, respectively. In a specific example, each of the elastic pressing members is a coil spring, a leaf spring, or a rubber.

In one example, a length of each of the first and second pressing blocks in a longitudinal direction corresponds to 80% or more of a length of each of the first and second plates in the longitudinal direction.

In one example, the first and second plates include first and second grippers protruding in a direction facing each other at opposite ends of the first and second plates, respectively. Further, the first and second grippers may be configured to contact an electrode lead of the battery cell.

Further, each of the first and second grippers have an embossed or debossed pattern on a surface thereof configured to contact the electrode lead of the battery cell.

In one example, the first and second plates are made of an insulating material, and the first and second grippers are made of a conductive material.

In another example, each of the first and second grippers may have an electric current terminal for electric current application, the electric current terminals being configured to contact and electrically connect to the electrode lead of the battery cell, and each of the first and second grippers may have a voltage terminal for voltage detection, the voltage terminals being configured to contact and electrically connect to the electrode lead of the battery cell.

Further, the present invention provides a method for charging and discharging a battery cell using the above-described device for charging and discharging a battery cell.

Advantageous Effects

According to a device for charging and discharging a battery cell and a method of charging and discharging a battery cell using the same of the present invention, it is possible to suppress a swelling phenomenon of a region between a body and a gas pocket of a battery cell during a formation process of the battery cell by including first and second pressing blocks which press the region between the body and the gas pocket of the battery cell.

BRIEF DESCRIPTION OF THE DRAWINGS

FIG. 1 is a photograph showing a pouch-type battery cell having gone through a formation process according to a conventional art.

FIG. 2 is a schematic diagram showing a region between the body and the gas pocket of a pouch-type battery cell having gone through a formation process according to a conventional art.

FIG. 3 is a schematic diagram showing a charge/discharge device of a battery cell according to one embodiment of the present invention.

FIG. 4 is a schematic diagram showing a structure in which a pressing block is formed in a plate in a device for charging and discharging a battery cell according to one embodiment of the present invention.

FIG. 5 is a schematic diagram showing a charge/discharge device of a battery cell according to another embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a device for charging and discharging a battery cell, and a method of charging and discharging a battery cell using the same.

When a formation process is performed using a charge and discharge device according to a conventional art, the body portion of the battery cell forming the thickness of the battery cell may be pressed by the pressing plate during the charge and discharge process, but the region between the body and the gas pocket of the battery cell is not pressed by the pressing plate because it has been partly sealed. When the gas pocket is sufficiently expanded by the formation process, the additionally generated gas in the battery cell expands the region between the body and the gas pocket of the battery cell. As such, the internal pressure of the pouch case increases due to gases generated during the charge and discharge process, and the adhesive layer of a region between the body and the gas pocket of the battery cell is broken. Further, the pouch case may be composed of an outer insulating layer and an inner adhesive layer made of a polymer material, and a metal layer interposed between the outer insulating layer and the inner adhesive layer. Herein, an insulation voltage defect is caused as a metal layer of the region between the body and the gas pocket of the battery cell is exposed by the above-described phenomenon.

As such, the present invention provides a device for charging and discharging a battery cell capable of suppressing a swelling phenomenon of a region between the body and the gas pocket of a battery cell during a formation process of the battery cell, and a method of charging and discharging a battery cell using the same. Specifically, according to an apparatus for charging and discharging a battery cell of the present invention, it is possible to suppress a swelling phenomenon of a region between the body and the gas pocket of a battery cell during a formation process of the battery cell by including first and second pressing blocks which press the region between the body and the gas pocket of the battery cell.

Hereinafter, a device for charging and discharging a battery cell, and a method of charging and discharging a battery cell using the same according to the present invention will be described in detail.

In one example, a device for charging and discharging a battery cell according to the present invention includes: first and second plates which have a battery cell therebetween and press two surfaces of the battery cell; and first and second pressing blocks which are formed on the first and second plates, respectively, and protrude to face each other. At this time, the first and second pressing blocks are arranged in a space between a body and a gas pocket of the battery cell.

Generally, in the formation process, the battery cell may swell due to gas generation or expansion of the positive electrode plate and the negative electrode plate. At this time, the first and second plates prevent the swelling by pressing the battery cells during the formation process. Specifically, in the charging and discharging device according to the present invention, first and second plates are arranged at regular intervals and are configured to be movable so that the interval may increase or decrease. Namely, the battery cell is arranged between first and second plates, and the first and second plates are moved in a direction that presses both surfaces of the battery cell to thereby press the battery cell.

Further, the first and second plates are connected in a manner that allows a transitional motion along the shaft extended in one side, gears are connected to one end of the shaft, and a drive motor may be connected to the gears. Herein, any mechanical combination may be used as long as it has a driving mechanism capable of moving first and second plates in a direction that presses battery cells.

The battery cell is a pouch type unit cell, and an electrode assembly having a positive electrode/separator/negative electrode structure may be embedded in an exterior material of the laminate sheet in a state that is connected to electrode leads formed outside the exterior material. The electrode leads may be drawn to the outside of the sheet and may be extended in the same or opposite direction to each other. Figures of the present invention show only a pouch-type battery cell having a form where a pair of electrode leads are withdrawn in the opposite direction for the convenience of explanation, but the battery cell, which is applied to the charging and discharging device according to the present invention, is not particularly limited thereto, and a pair of electrode leads may be withdrawn in the same direction. Herein, the pouch-type battery cell may include a gas pocket. Specifically, the gas pocket is a portion extended in a direction perpendicular to the electrode lead in the body region of the battery cell pressed during the formation process as a part of the pouch exterior material and may be cut in the pouch exterior material later.

In one example, the first and second plates may be made of a metal material having a high mechanical rigidity so that they are not deformed at high heat and pressure. For example, aluminum or stainless steel may be used. However, the material of the pressing plate is limited to a metal material, and the pressing plate may also be made of reinforced plastic, reinforced ceramic, or tempered glass.

In one example, battery cells including a gas pocket in a deactivated state are delivered by pickup equipment and are then inserted into a space between first and second plates.

In one example, the device for charging and discharging a battery cell according to the present invention includes first and second pressing blocks. In a specific example, the first and second pressing blocks are formed at the inner side of the first and second plates and are arranged in a space between the body and the gas pocket of the battery cell. The first and second pressing blocks are used to suppress a swelling phenomenon of the region between the body and the gas pocket of the battery cell during the formation process of the battery cell and are used to prevent pouch deformation in the region between the body and the gas pocket of the battery cell.

In one example, the first and second pressing blocks are formed along a longitudinal direction of the first and second plates. Herein, the longitudinal direction means a direction which is extended in a direction perpendicular to the structure where the electrode lead protrudes in the body of the battery cell. Further, a length of each of the first and second pressing blocks corresponds to 80% or more of a length of each of the first and second plates. For example, the length of the first and second pressing blocks may correspond to the total length of the first and second plates, respectively.

In a specific example, the length of the first and second pressing blocks corresponds to 80 to 120% of the length of the battery cell which becomes the subject of formation. Further, the first and second pressing blocks may have a convex shape on the basis of the cross-section. This is to efficiently press the battery cell by increasing an area directly contacting the battery cell and to prevent a damage to the battery cell by making the area contacting the battery cell smooth during the formation process of the battery cell.

Further, the first and second pressing blocks are used to suppress the swelling phenomenon of the region between the body and the gas pocket of the battery cell, but the gas moving path, which is formed between the body and the gas pocket of the battery cell, should not be closed. Namely, it is desirable not to reduce the expansion capacity of the gas pocket by performing pressurization with 10 to 20 mm level by the first and second pressing blocks.

In another example, in the device for charging and discharging a battery cell according to the present invention, an elastic pressing member is interposed between the first plate and the first pressing block and between the second plate and the second pressing block, respectively. The elastic pressing member is a coil spring, a leaf spring, or a rubber. For example, the elastic pressing member may be a coil spring. The coil spring is a spring having a force resistant to the compressive force and refers to a compression spring.

In a specific example, the first and second pressing blocks may be integrally moved when the first and second plates are moved as the first and second pressing blocks are respectively connected to the first and second plates and the elastic pressing member. Namely, when the first and second plates press the body region of the battery cell, the first and second pressing blocks press the region between the body and the gas pocket of the battery cell. At this time, the first and second pressing blocks are elastically pushed into the elastic pressing member and an impact may be absorbed when contacting the corresponding region of the battery cell, and the contacted state may be stably maintained as elastic restoring force of the elastic pressing member is applied.

Further, the first and second pressing blocks may be made of an epoxy material as a portion which directly contacts the battery cell. However, the present invention is not limited thereto.

In one example, the device for charging and discharging a battery cell according to the present invention includes first and second grippers having a structure contacting the electrode lead. The first and second grippers contact the electrode leads of the battery cell to thereby apply an electric current to the battery cell and detect a voltage. Particularly, the first and second grippers are configured to be integrally moved when the first and second plates are moved as the first and second grippers are respectively connected to the first and second plates. In a specific example, the first and second grippers have a structure which is connected to the first and second plates and protrude at a portion facing each other to contact electrode leads of the battery cell. The first gripper may have a structure which is connected to each of both ends of the first plate, and is arranged to be perpendicular to the first plate, and the second gripper may have a structure which is connected to each of both ends of the second plate, and is arranged to be perpendicular to the second plate. At this time, the first and second grippers may be arranged in a region facing each other and easily fix the electrode leads of the battery cell.

In one example, the first and second grippers have an electric current terminal for electric current application, which contacts and is electrically connected to the electrode lead of the battery cell, and the first and second grippers have a voltage terminal for voltage detection, which contacts and is electrically connected to the electrode lead of the battery cell. The first and second grippers themselves may be composed of an electric current terminal and a voltage terminal. At this time, the first and second grippers may be made of a conductive member. For example, the first and second grippers may be made of aluminum, copper or nickel, for example, nickel or copper having an excellent electrical conductivity, or an alloy of copper and nickel. However, the present invention is not limited thereto.

In another example, the first and second grippers may further include an electric current terminal and a voltage terminal as described above. Particularly, the electric current terminal and the voltage terminal are configured to electrically contact the electrode lead of the battery cell when the first and second plates press the battery cell. Further, a cable for supplying an electric current terminal may be connected to the electric current terminal and the voltage terminal.

In another example, the first and second grippers have an embossed or debossed grid on a surface contacting the electrode lead of the battery cell. Specifically, the fixing force of the first and second grippers on the electrode lead of the battery cell may be enhanced by forming a grid on the surface of the first and second grippers. In the present invention, the grid means a grid or checkerboard scale pattern and is a general term indicating a form where two or more parallel patterns cross each other. In a specific example, an average recess depth or an average protrusion height of the debossed or embossed grid formed on the surface of the first and second grippers is in a range of 0.001 to 1 mm. For example, the average recess depth or protrusion height of the grid is in the range of 0.001 to 0.1 mm, 0.001 to 0.01 mm, 0.001 to 0.1 mm, or 0.01 to 0.05 mm. In the present invention, it is possible to enhance the fixing force with the electrode lead while not deteriorating the mechanical property of the electrode lead by forming a very low level of recess or protruding pattern.

Further, the height of the protruding structure of the first and second grippers may be greater than that of the protruding structure of the first and second pressing blocks. In a specific example, the first and second grippers further protrude than the first and second pressing blocks by 10% or more. For example, when the height of the first and second grippers is 22 mm, the height of the first and second pressing blocks 121 and 122 may be equal to or less than 20 mm. This is to prevent the closure of the gas moving path formed between the body and the gas pocket of the battery cell during the formation process of the battery cell.

In another example, in the device for charging and discharging a battery cell according to the present invention, at least one elastic pressing member is interposed between the first pressing plate and the first plate and between the second pressing plate and the second plate. For example, in the device for charging and discharging a battery cell according to the present invention, an elastic pressing member is interposed between the second gripper and the second plate.

In a specific example, when the first and second plates press the battery cell, the second gripper, which is connected to the elastic pressing member, is elastically pushed in and an impact may be absorbed when contacting the electrode lead of the battery cell, and the contacted state may be stably maintained elastic restoring force of the elastic pressing member is applied. Further, the elastic coefficient of the elastic pressing member disposed between the second gripper and the second plate may be different from the elastic coefficient of the elastic pressing member disposed between the pressing block and the plate.

The device for charging and discharging a battery cell according to the present invention can easily fix the electrode lead and suppress swelling phenomenon of the region between the body and the gas pocket of the battery cell during the formation process of the battery cell by this configuration.

Further, the present invention provides a method for forming a battery cell using the above-described device for forming a battery cell. In a specific example, the formation method of a battery cell according to the present invention may be performed after interposing a battery cell in the charge and discharge device of the battery cell. According to a method of charging and discharging a battery cell of the present invention, it is possible to suppress a swelling phenomenon of a region between the body and the gas pocket of a battery cell during a formation process of the battery cell by including first and second pressing blocks which press the region between the body and the gas pocket of the battery cell. For example, the pressure range of the first and second pressing blocks may range from 5 to 15 mm, and the battery cell can be pressed to about 10 mm on average.

Hereinafter, various forms of a device for charging and discharging a battery cell capable of suppressing a swelling phenomenon of a region between the body and the gas pocket of a battery cell during a formation process of the battery cell will be described with reference to drawings.

First Embodiment

FIG. 3 is a schematic diagram showing a charge/discharge device of a battery cell according to one embodiment of the present invention, and FIG. 4 is a schematic diagram showing a structure in which a pressing block is formed in a plate in a device for charging and discharging a battery cell according to one embodiment of the present invention.

Referring to FIGS. 3 and 4, the device 100 for charging and discharging a battery cell according to the present invention includes: first and second plates 111 and 112 which have a battery cell therebetween and press two surfaces of the battery cell 1; and first and second pressing blocks 121 and 122 which are formed on the first and second plates 111 and 112, respectively, and protrude to face each other. At this time, the first and second pressing blocks 121 and 122 are arranged in a space between a body 1*a* and a gas pocket 1*b* of the battery cell.

In the formation process, the battery cell may swell due to gas generation or expansion of the positive electrode plate and the negative electrode plate. At this time, the first and second plates 111 and 112 are pressing plates which prevent the swelling by pressing the battery cells 1 during the formation process. Specifically, in the charging and discharging device 100 according to the present invention, first and second plates 111 and 112 are arranged at regular intervals and are configured to be movable so that the interval may increase or decrease. Namely, the battery cell 1 is arranged between first and second plates 111 and 112, and the first and second plates 111 and 112 are moved in a direction that presses both surfaces of the battery cell 1 to thereby press the battery cell 1.

Although not illustrated in the drawings, first and second plates are connected in a manner that allows a transitional motion along the shaft extended in one side, gears are connected to one end of the shaft, and a drive motor may be connected to the gears. Herein, any mechanical combination may be used as long as it has a driving mechanism capable of moving first and second plates 111 and 112 in a direction that presses battery cells 1.

On the other hand, the first and second plates 111 and 112 are made of a material having a high rigidity so that they are not deformed by high heat and pressure. For example, the first and second plates 111 and 112 are made of a reinforced plastic.

Further, the device 100 for charging and discharging a battery cell according to the present invention includes first and second pressing blocks 121 and 122. Specifically, the first and second pressing blocks 121 and 122 are formed at the inner side of the first and second plates 111 and 112 and are arranged in a space between the body 1a and the gas pocket 1b of the battery cell. The first and second pressing blocks 121 and 122 are used to suppress the swelling phenomenon of the region between the body 1a and the gas pocket 1b of the battery cell during the formation process of the battery cell and are used to prevent pouch deformation in the region between the body 1a and the gas pocket 1b of the battery cell 1.

Specifically, the first and second pressing blocks 121 and 122 are formed along a longitudinal direction of the first and second plates 111 and 112. Herein, the longitudinal direction means a direction which is extended in a direction perpendicular to the electrode lead 1c in the body 1a of the battery cell. Further, a length of each of the first and second pressing blocks 121 and 122 corresponds to 80% or more of a length of each of the first and second plates 111 and 112. In FIG. 4, the length of the first and second pressing blocks 121 and 122 may correspond to the total length of the first and second plates 111 and 112, respectively, but the present invention is not limited to this example.

In a specific example, the length of the first and second pressing blocks 121 and 122 corresponds to 80 to 120% of the length of the battery cell which becomes the subject of formation. Further, the first and second pressing blocks 121 and 122 have a convex shape on the basis of the cross-section. This is to efficiently press the battery cell 1 by increasing an area directly contacting the battery cell 1 and to prevent a damage to the battery cell 1 by making the area contacting the battery cell 1 smooth during the formation process of the battery cell 1.

Further, the first and second pressing blocks 121 and 122 are used to suppress the swelling phenomenon of the region between the body 1a and the gas pocket 1b of the battery cell, but the gas moving path, which is formed between the body 1a and the gas pocket 1b of the battery cell, should not be closed. Namely, it is desirable not to reduce the expansion capacity of the gas pocket by performing pressurization with 10 to 20 mm level by the first and second pressing blocks 121 and 122.

Further, the device 100 for charging and discharging a battery cell according to the present invention includes first and second grippers 131 and 132 having a structure contacting the electrode lead 1c. The first and second grippers 131 and 132 contact electrode leads 1c to thereby apply an electric current to the battery cell 1 and detect a voltage. Specifically, the first and second grippers 131 and 132 are configured to be integrally moved when the first and second plates 111 and 112 are moved as the first and second grippers 121 and 122 are respectively connected to the first and second plates 111 and 112. The first and second grippers 131 and 132 are respectively connected to the first and second plates 111 and 112 and protrude at a portion facing each other to contact the electrode lead 1c of the battery cell 1. Specifically, the first gripper 131 is connected to each of both ends of the first plate 111 and is arranged to be perpendicular to the first plate 111. Further, the second gripper 132 is connected to each of both ends of the second plate 112 and is arranged to be perpendicular to the second plate 112.

The height of the protruding structure of the first and second grippers 131 and 132 is greater than that of the protruding structure of the first and second pressing blocks 121 and 122. Though not illustrated in the drawings, the first and second grippers 131 and 132 further protrude than the first and second pressing blocks 121 and 122 by 10% or more. For example, when the height of the first and second grippers 131 and 132 is 22 mm, the height of the first and second pressing blocks 121 and 122 is equal to or less than 20 mm. This is to prevent the closure of the gas moving path formed between the body 1a and the gas pocket 1b of the battery cell during the formation process of the battery cell 1.

The device 100 for charging and discharging a battery cell according to the present invention can easily fix the lead region and suppress swelling phenomenon of the region between the body 1a and the gas pocket 1b of the battery cell during the formation process of the battery cell 1 by this configuration.

Second Embodiment

FIG. 5 is a schematic diagram showing a charge/discharge device of a battery cell according to another embodiment of the present invention.

Referring to FIG. 5, the device 200 for charging and discharging a battery cell according to another embodiment of the present invention includes: first and second plates 211 and 212 which have a battery cell therebetween and press two surfaces of the battery cell 1; and first and second pressing blocks 221 and 222 which are formed on the first and second plates 211 and 212, respectively, and protrude to face each other. At this time, the first and second pressing blocks 221 and 222 are arranged in a space between a body 1a and a gas pocket 1b of the battery cell.

Further, in the device 200 for charging and discharging a battery cell according to the present invention, an elastic pressing member 240 is interposed between the first plate 211 and the first pressing block 221 and between the second plate 212 and the second pressing block 222, respectively. At this time, the elastic pressing member 240 may be a coil spring.

The first and second pressing blocks 221 and 222 may be integrally moved when the first and second plates 211 and 212 are moved as the first and second pressing blocks 221 and 222 are respectively connected to the first and second plates 211 and 212 and the elastic pressing member 240. Namely, when the first and second plates 211 and 212 press the body 1a of the battery cell 1, the first and second pressing blocks 221 and 222 press the region between the body 1a and the gas pocket 1b of the battery cell. At this time, the first and second pressing blocks 221 and 222 are elastically pushed into the elastic pressing member 240 and an impact may be absorbed when contacting the corresponding region of the battery cell 1, and the contacted state may be stably maintained as elastic restoring force of the elastic pressing member 240 is applied.

Further, the height of the first and second pressing blocks 221 and 222 in a state that has been restored by the elastic pressing member 240 is smaller than the height of the protruding structure of first and second grippers (not shown). Specifically, the first and second grippers protrude to have a height greater than that in a state, in which the first and second pressing blocks 221 and 222 are restored by the elastic pressing member 240, by about 10% or more. For example, when the height in a state that the first and second pressing blocks 221 and 222 are restored by the elastic pressing member 240 is about 20 mm, the height of the protruding structure of the first and second grippers may be about 22 mm. This is to prevent the closure of the gas moving path formed between the body 1a and the gas pocket 1b of the battery cell during the formation process of the battery cell 1.

Since the configuration of the device 200 for charging and discharging a battery cell has been described above, the detailed description of each component will be omitted here.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

The invention claimed is:

1. A device for charging and discharging a battery cell, the device comprising:
 first and second plates spaced from each other, the first and second plates being configured to press respective first and second surfaces of a battery cell locatable therebetween;
 first and second pressing blocks located on the first and second plates, respectively, the first and second pressing blocks protruding from the first and second plates to face each other; and
 first and second elastic pressing members being interposed between the first plate and the first pressing block and between the second plate and the second pressing block, respectively,
 wherein the first and second pressing blocks are locatable in a space between a body and a gas pocket of the battery cell.

2. The device of claim 1, wherein each of the first and second elastic pressing members is a coil spring, a leaf spring, or a rubber.

3. The device of claim 1, wherein a length of each of the first and second pressing blocks in a longitudinal direction corresponds to 80% or more of a length of each of the first and second plates in the longitudinal direction.

4. The device of claim 1, wherein the first and second plates include first and second grippers protruding in a direction facing each other at opposite ends of the first and second plates, respectively, and
 wherein the first and second grippers are configured to contact an electrode lead of the battery cell.

5. The device of claim 4, wherein each of the first and second grippers has an embossed or debossed pattern on a surface thereof configured to contact the electrode lead of the battery cell.

6. The device of claim 4, wherein the first and second plates are made of an insulating material, and
 wherein the first and second grippers are made of a conductive material.

7. The device of claim 4, wherein each of the first and second grippers has an electric current terminal for electric current application, the electric current terminals being configured to contact and electrically connect to the electrode lead of the battery cell.

8. The device of claim 4, wherein each of the first and second grippers has a voltage terminal for voltage detection, the voltage terminals being configured to contact and electrically connect to the electrode lead of the battery cell.

9. A method for charging and discharging a battery cell using the device according to claim 1.

\* \* \* \* \*